United States Patent
Goncze et al.

[11] Patent Number: 6,050,285
[45] Date of Patent: Apr. 18, 2000

[54] PRESSURE BALANCING VALVE

[75] Inventors: Zoltan Goncze, Northbrook; Dane F. Watkins, Evanston, both of Ill.

[73] Assignee: Mark Controls Corporation, Skokie, Ill.

[21] Appl. No.: 09/172,284

[22] Filed: Oct. 14, 1998

[51] Int. Cl.[7] .................................................. G05D 11/03
[52] U.S. Cl. ..................... 137/98; 137/315; 137/454.6; 251/51
[58] Field of Search ........................ 137/98, 100, 454.6, 137/15, 315; 251/51, 52

[56] References Cited

U.S. PATENT DOCUMENTS

| | | |
|---|---|---|
| 2,704,650 | 3/1955 | Rand . |
| 3,048,274 | 8/1962 | Lundeen . |
| 3,113,756 | 12/1963 | Griffo .................................. 137/505.42 |
| 3,688,790 | 9/1972 | Esten . |
| 3,724,480 | 4/1973 | Povalski et al. . |
| 3,807,426 | 4/1974 | Henes . |
| 3,921,659 | 11/1975 | Rudewick, III . |
| 4,094,333 | 6/1978 | Petursson . |
| 4,095,610 | 6/1978 | Priesmeyer . |
| 4,130,136 | 12/1978 | Garnier et al. . |
| 4,185,771 | 1/1980 | Killias . |
| 4,226,260 | 10/1980 | Schmitt . |
| 4,241,749 | 12/1980 | Petursson . |
| 4,243,063 | 1/1981 | Parkison . |
| 4,324,267 | 4/1982 | Bach . |
| 4,349,149 | 9/1982 | Humpert . |
| 4,362,186 | 12/1982 | Parkison et al. . |
| 4,397,330 | 8/1983 | Hayman . |
| 4,425,935 | 1/1984 | Gonzalez . |
| 4,458,839 | 7/1984 | MacDonald . |
| 4,700,928 | 10/1987 | Marty . |
| 4,901,750 | 2/1990 | Nicklas et al. . |
| 4,905,732 | 3/1990 | Bright et al. . |
| 4,915,295 | 4/1990 | Pullen et al. . |
| 4,971,112 | 11/1990 | Knapp . |
| 5,040,566 | 8/1991 | Orlandi . |
| 5,067,513 | 11/1991 | Nicklas et al. . |
| 5,129,576 | 7/1992 | Pullen et al. . |
| 5,297,322 | 3/1994 | Kraus . |
| 5,299,593 | 4/1994 | Ottelli . |
| 5,355,906 | 10/1994 | Marty et al. . |
| 5,425,394 | 6/1995 | Clare . |
| 5,441,075 | 8/1995 | Clare . |
| 5,492,149 | 2/1996 | Loschelder et al. . |
| 5,501,244 | 3/1996 | Shahriar . |
| 5,505,225 | 4/1996 | Niakan . |
| 5,664,598 | 9/1997 | Shieh ...................................... 137/100 |

OTHER PUBLICATIONS

ASSE Standard No. 1016, Performance Requirements for Individual Thermostatic, Pressure Balancing and Combination Pressure Balancing and Thermostatic Control Valves for Individual Fixtures, dated Dec., 1996.

*Primary Examiner*—Stephen M. Hepperle
*Attorney, Agent, or Firm*—Brinks Hofer Gilson and Lione

[57] ABSTRACT

A pressure balancing valve and method of assembly is disclosed. The valve includes a pressure balancer cartridge having a poppet assembly made up of releasably connectable poppet valves movably mounted on opposite sides of a diaphragm. The pressure balancer cartridge utilizes compliant members mounted on water flow controlling orifices to form a sealable opening in cooperation with the closure surface of a respective poppet. Each poppet has a reduced diameter end that fits within a damping chamber and uses a sealing member mounted on each poppet valve to increase tolerances and improve manufacturing yield. The method includes the step of aligning poppet halves and connecting the interlocking connectors of the two halves through a diaphragm.

17 Claims, 8 Drawing Sheets

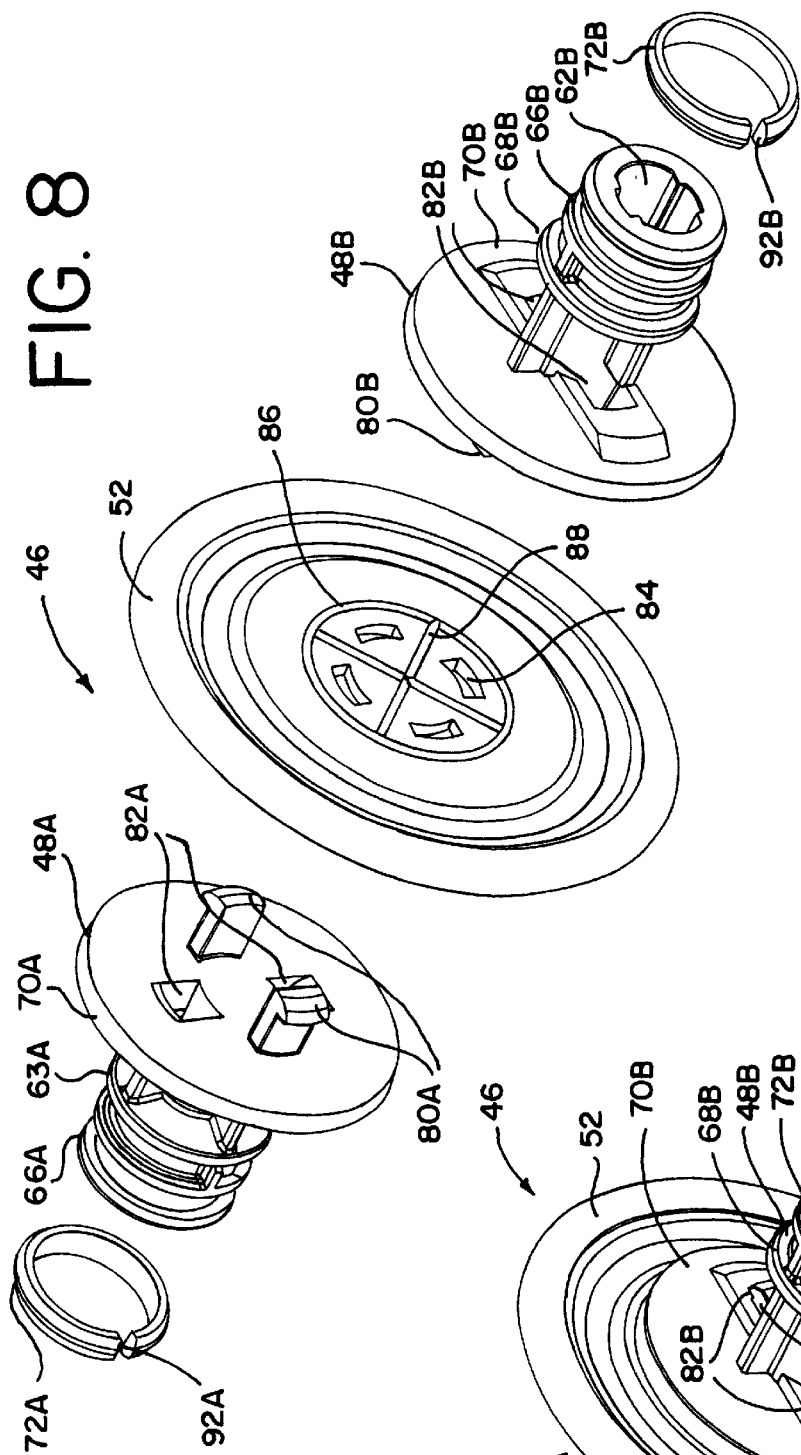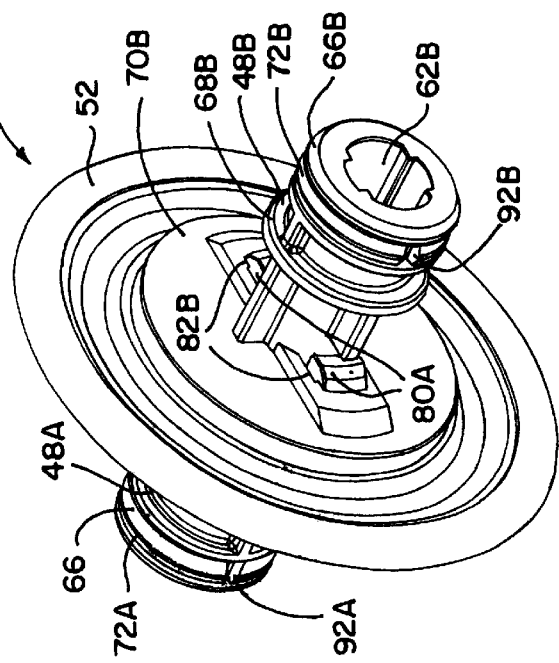

PRESSURE BALANCING VALVE

FIELD OF THE INVENTION

The present invention relates to in-wall pressure balancing tub and shower valves for use in commercial, institutional and residential installations. More particularly, the present invention relates to diaphragm-type pressure balancing valves with an improved ability to maintain a set temperature despite variations in water supply pressure.

BACKGROUND OF THE INVENTION

Pressure balancing tub and shower valves are generally used in commercial or public buildings and lately in residential homes. Typically, a pressure balancing valve for a shower, bathtub or combined bathtub and shower is mounted inside the wall and provides water to the shower head or bathtub outlets. Usually the valve is controlled by a single handle that rotates from off to full cold to mixed hot/cold to full hot positions without volume control. Due to changing water demand throughout a home or building plumbing system, the water pressures in the hot and cold supply lines are constantly fluctuating. Pressure increases or decreases can cause unpleasant changes in water temperature or, in extreme cases, can cause scalding. With wide use of manual fast closing valves and electronically controlled solenoid valves, which can cause sudden pressure changes in supply lines, there has been an increased demand for pressure balancing valves. Pressure balancing valves are intended to provide a steady hot/cold water mix ratio regardless of the changing pressure in the supply lines.

There are two types of pressure balancing valves in use in the plumbing industry. The first is the spool and sleeve type and the second is the diaphragm type. Both of these valves utilize the same principle. The pressure balancing mechanism is placed in the constantly pressurized part of the valve in front of the mixing assembly. These valves are designed and manufactured for specific applications and must meet performance requirements set forth in American Society of Sanitary Engineering (ASSE) Standard No. 1016-96. In the diaphragm type of pressure balancing valve, the pressure balancing mechanism is usually contained within a removable cartridge seated within the valve.

The diaphragm type pressure balancing valve usually contains a pressure balancing cartridge made from two molded cartridge halves which separate the hot and cold water passages with the help of a diaphragm. Hot and cold water poppet valves are connected to the diaphragm positioned between the cartridge halves. The poppet valves control the flow of water through a controlling orifice within each water passage. The function of the pressure balancing valve is to provide equal outlet pressures regardless of the hot and cold inlet pressures when water is flowing. The diaphragm/poppet valve assembly reacts to pressure variations. When the pressure increases on one side, the poppet valve assembly moves toward the lower pressure side due to the unbalanced forces. This movement on the higher pressure side reduces the gap between the poppet valve and the seat in the controlling orifice, thus causing an increase in the pressure drop at the controlling orifice. On the lower pressure side, the gap between the poppet valve and the controlling orifice seat increases, causing a reduction in the pressure drop at the controlling orifice. The pressure balancing cartridge also contains damping chambers which serve to slow down the movement of the poppet valve assembly and prevent unnecessary oscillation. The poppet valve assembly moves until the pressures on the two sides of the diaphragm are equal and the pressure in the damping chambers is equal with the outlet pressure.

It is desirable that a pressure balancing valve have the characteristics of a large stroke, short response time, high sensitivity to pressure changes and as a result of this, good temperature control. The stroke defines the range of movement of the poppet valves within the pressure balancing cartridge and defines the maximum flow that the poppet valve will allow through the controlling orifice. The bigger the stroke, the more water flow that can be delivered under normal operating conditions. The response time of the valve is how fast the valve reacts to pressure fluctuations or failure in the supply lines. An important function of the pressure balancing valve is to reduce the flow of hot water quickly upon cold water pressure failure in order to prevent any user discomfort. The valve must reduce the hot water flow under 0.5 GPM within five seconds (per ASSE 1016-96).

The pressure balancing mechanism relies on the action of inlet water pressure on the diaphragm to properly move the poppet valves. The valve sensitivity relates to required inlet pressure differential needed to move the diaphragm and operate the poppet valves. With the introduction of new "low-flow" shower heads, higher back pressures created in the balance chamber, which reduces pressure drop through the control orifices, thereby requiring a more sensitive pressure balancer valve. Most types of valves meet the required performance standards with higher flow rates (3–5 GPM). However, under present Federal law, water through a shower head is restricted to a maximum of 2.5 GPM at 80 psi, and 2.2 GPM and lower flow rate restrictors are widely in use. The valve's sensitivity to pressure changes also relates to its ability to control the temperature of the water delivered to the user. Highly sensitive valve can detect slight pressure changes and adjust itself to maintain the user set mix of hot and cold water ratio.

To address the problem of valve sensitivity and increase responsiveness to pressure variations in low flow environments, various pressure balancing valve configurations have been attempted in the industry. One of these configurations combined the diaphragm type valve's superior responsiveness with the spool & sleeve type valve flow control mechanism. The sensitivity of this valve was increased partially with the introduction of an unbiased, un-reinforced rolling diaphragm. Further improvement was made by removing the O-rings from the damping chambers.

While there are benefits from this configuration, these types of valves have a very high manufacturing cost. The two cartridge halves which make up the pressure balancing cartridge must be aligned perfectly in order to allow for friction free movement of the poppet valve/diaphragm assembly. The poppet holes for each cartridge half have to be machined with very tight tolerances for plastic parts. In addition, two precisely placed alignment holes need to be bored. The hot and cold poppet valves which sit within these poppet holes must be made from one metal piece and must also meet close tolerances in diameter and circular run-out. Finally, the radial clearance within the controlling orifices and damping chambers, between the poppet valve and poppet hole, has to be minimal. These tight tolerances and their associated production difficulties can complicate the manufacturing process as well as result in an unacceptably high manufacturing reject rate.

Other prior art introduces a diaphragm-type pressure balancing valve. Hot and cold water enter the pressure balancing cartridge through hollow poppet valves. Instead of being connected to the poppet valve, the diaphragm is connected to a special housing which contains the flow controlling orifices. The different hot and cold water outlet pressures force the diaphragm/controlling orifices assembly to move and eventually equalize the outlet pressures. The potential problem with this design is the two O-ring seal between the poppet valves and the controlling orifice housing. This seal must maintain proper lubrication. As soon as the lubricant washes away, the increased friction alters the responsiveness and reduces the sensitivity of the valve requiring higher pressure differentials in operation.

Still another prior art valve attempts to address the previously described valve's manufacturability problems. This valve places an O-ring on the poppet valve in the inlet channel which gives the opportunity to increase the radial clearance between the poppet valve and the poppet hole in the flow controlling orifice. On the hot water side, in the case of cold water pressure failure, this O-ring seals against the flow controlling orifice seat. Unfortunately, this type of valve fails to eliminate many of the typical manufacturing problems. The two cartridge halves' poppet holes still need to be machined to exacting tolerances. The one piece metal poppet valve (incorporating both the hot and cold poppet valves) requires close tolerances in diameter and circular run-out. Finally, the radial clearance between the poppet valve and the poppet hole in the damping chamber is still critical for proper temperature control and proper cold water failure performance. While this assembly is more flexible in terms of misalignment tolerances between the cartridge halves, it can still require costly secondary manufacturing operations. The increased clearance within the damping chambers further negatively effects the valve temperature controlling ability.

In view of the presently available valves described above, it must be concluded that there is a need for an improved pressure balancing valve which addresses the drawbacks of existing pressure balancing valves.

SUMMARY OF THE INVENTION

To address the above-described need for an improved pressure balancing valve, a pressure balancing valve is disclosed herein that can be manufactured from molded cartridge halves without the need for secondary manufacturing operations. Generally, injection molded parts require looser tolerances which usually do not meet the required dimensional stability as well as machined metal parts due to shrinkage, draft and moisture absorption. The pressure balancing valve disclosed herein provides built-in design flexibility in order to use molded components with their inherent tolerances. As described in more detail below, a preferred embodiment of the pressure balancing cartridge allows for an increased radial clearance between the poppet valve and the damping chamber wall while retaining performance quality.

According to one aspect of the present invention, a balance chamber cartridge is provided for use in a pressure balancing valve. The pressure balancer includes first and second poppet valves that each have at least one releasable connector and are releasably connectable to one another. Preferably the connectors are snap fit connectors that fit through a flexible diaphragm so that the pressure balancing valve is simple to assemble.

In another aspect of the present invention, a pressure balancing cartridge for a pressure balancing valve includes a housing that provides controlled, equal pressures to the outlets. The pressure balancing valve has first and second inlets for receiving a supply of water into the balance chamber, first and second outlets for transmitting a flow of water out of the balance chamber, and first and second controlling orifices each connecting a respective one of the inlets to a respective one of the outlets so that the cavity defines first and second separate flow paths for hot and cold water. A poppet valve assembly having first and second poppet valves is movably mounted within the cavity. Each of the poppet valves have a damping chamber end with a smaller diameter than that of the respective damping chambers. A damping chamber sealing member is disposed on the damping chamber end of each poppet. Each poppet also includes a closure portion for cooperatively sealing against a compliant member attached to a respective flow controlling orifice. The poppets also include a hub connected to the closure portion that has at least one releasably interlocking connector designed to connect with a releasably interlocking connector on another poppet half. A flexible diaphragm mounted between the poppet halves separates the hot and cold water sides of the cavity and is responsive to changes in fluid pressure.

According to a third aspect of the present invention, a method of assembling a pressure balancer cartridge in a pressure balancing valve includes the steps of providing a poppet assembly that includes a flexible diaphragm and a pair of releasably connectable poppet valves, passing the connector of the first poppet valve through an opening in the diaphragm, orienting the connector on the second poppet valve to align with receiver portions of the first poppet valve and aligning the connector portions of the second poppet valve with the receiver portions of the first poppet valve, and connecting the second poppet valve through the openings of the diaphragm to interlock the connector and receiver portions of the first and second poppet valves.

BRIEF DESCRIPTION OF THE DRAWINGS

FIG. 8 is an exploded perspective view of a poppet valve assembly for use with the pressure balancing valve of FIGS. 1–7.

FIG. 9 is a perspective view of the assembled poppet valve assembly for use with the pressure balancing valve of FIGS. 1–7.

DETAILED DESCRIPTION OF THE PRESENTLY PREFERRED EMBODIMENT

Figure 1:
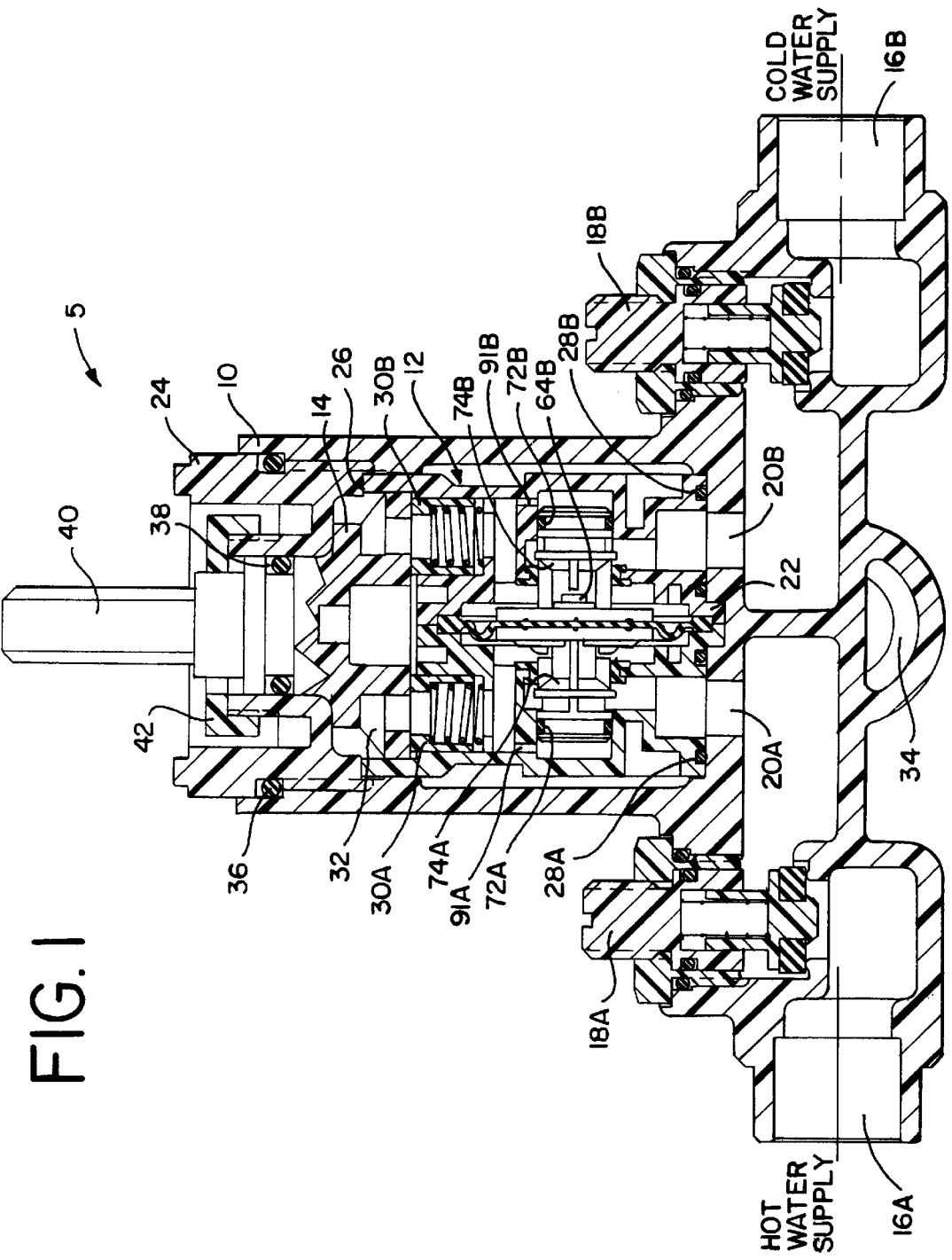
FIG. 1 is a cross-sectional view of a pressure balancing valve according to a preferred embodiment.

Referring to FIG. 1, there is depicted a preferred pressure balancing valve 5. The pressure balancing valve 5 includes a valve housing 10 which contains the pressure balancing cartridge 12 and the mixing plate assembly 14. The valve housing 10 also provides for connections to hot and cold water sources 16A, 16B and check valves 18A, 18B which can be used to shut off the flow of water to perform maintenance on the valve. The pressure balancing cartridge 12 is removable and fits into the valve housing 10 over the hot and cold water inlets 20A, 20B. A rectangular protrusion 22 from the cartridge 12 prevents misalignment during insertion and prevents the cartridge 12 from moving once installed in the valve housing 10. A threaded bonnet 24 encloses the valve housing 10 and forces the pressure balancing cartridge 12 against stop logs 26. The threaded bonnet 24 acts to press down on the pressure balancing cartridge 12 compressing two O-rings 28A, 28B which provide a pressure tight seal around the hot and cold water inlets 20A, 20B. The threaded bonnet 24 also serves as a truss and radial bearing for the mixing plate assembly 14. The mixing plate assembly's 14 placement provides predetermined pressure on the pressure balancing cartridge's 12 outlet seals 30A, 30B.

The threaded bonnet 24, the valve housing 10 and the mixing plate assembly 14 together form the mixing chamber 32 where the hot and cold water are mixed before flowing to the outlet 34. An O-ring 36 seals the mixing chamber 32 between the threaded bonnet 24 and the valve housing 10. An additional O-ring 38 seals the mixing chamber 32 between the threaded bonnet 24 and the mixing plate stem 40. The adjustable high limit stop 42 located on the outside part of the threaded bonnet 24 and the stop logs 26 located on the interior of the valve housing 10 both serve to limit the mixing plate assembly's 14 rotation and fix the temperature range of the valve 5.

Figure 2:
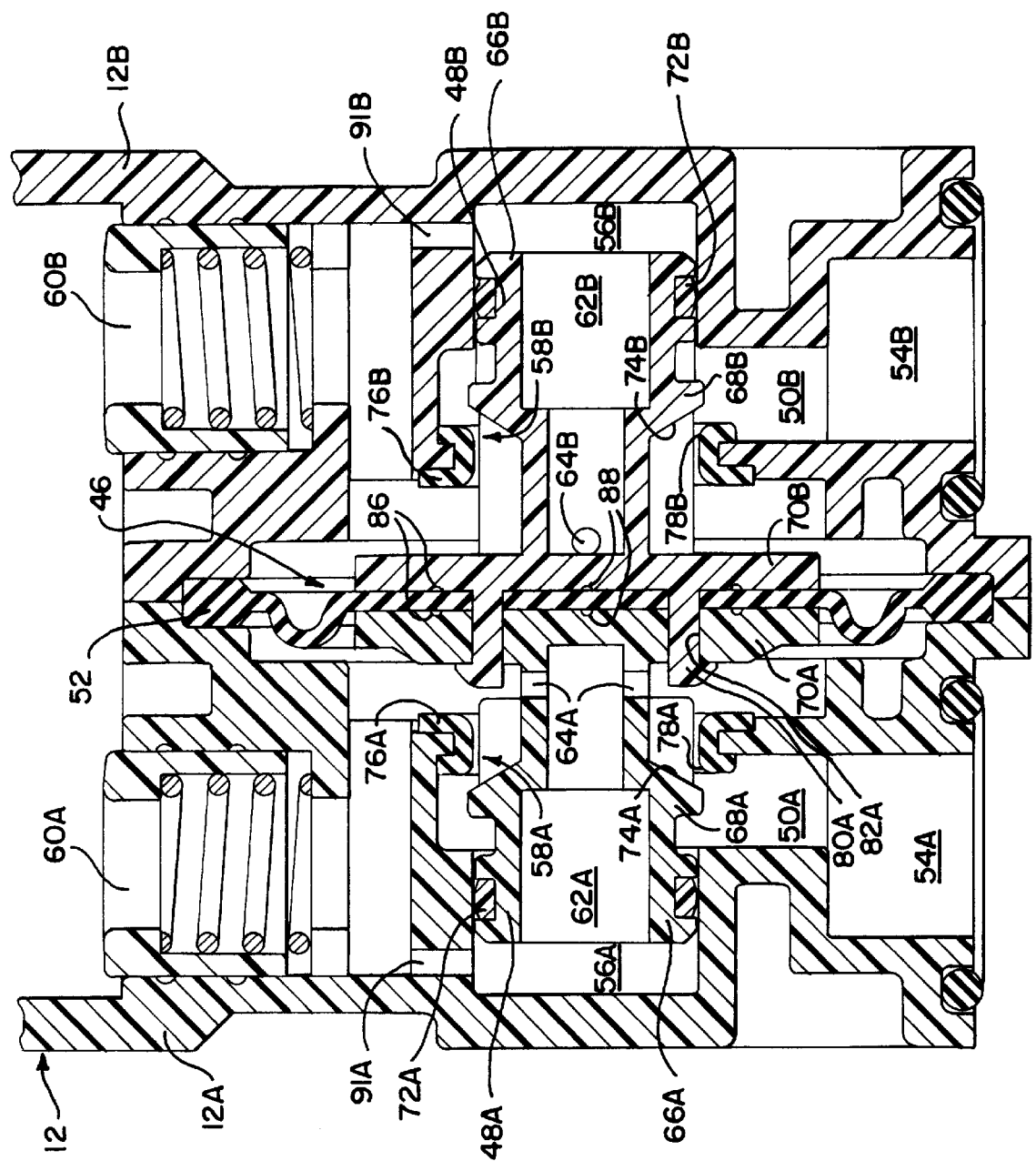
FIG. 2 is a cross-sectional view of a pressure balancing cartridge for use with the embodiment of FIG. 1 operating in a 50%—50% mixing position.

FIG. 2 depicts the pressure balancing cartridge 12 in more detail as it would operate to deliver a 50%—50% mix of hot and cold water. The pressure balancing cartridge 12 is made up of two cartridge halves 12A, 12B which are affixed together by rivets 44 (FIG. 3) or other similar means. Mounted between the two cartridge halves 12A, 12B is a poppet valve assembly 46. The poppet valve assembly 46 (see also FIGS. 8 & 9) consists of two identical poppet valves 48A, 48B, one for the hot water passageway 50A and the other for the cold water passageway 50B. Captured between the hot and cold poppet valves 48A, 48B is a flexible diaphragm 52. The flexible diaphragm 52 is also captured between the two cartridge halves 12A, 12B creating a seal between the hot and cold water passageways 50A, 50B.

Each cartridge half 12A, 12B has a water inlet 54A, 54B, a damping chamber 56A, 56B, a controlling orifice 58A, 58B and a water outlet 60A, 60B. The water passageways 50A, 50B are defined by the flow of water from the water inlets 54A, 54B through the respective controlling orifices 58A, 58B to the respective water outlets 60A, 60B. The damping chambers 56A, 56B prevent rapid movement of the poppet valve assembly 46 as the inlet water pressures vary. Each poppet valve 48A, 48B is preferably made from a molded plastic or other suitable material. Each poppet valve 48A, 48B is fabricated with an internal cavity 62A, 62B open to a respective damping chamber 56A, 56B and bypass holes 64A, 64B (described below), a damping section 66A, 66B, a sealing section 68A, 68B, and a support plate 70A, 70B. When the poppet valve assembly 46 is captured within the pressure balancing cartridge 12, the damping section 66A, 66B of each poppet valve 48A, 48B sits within the respective damping chambers 56A, 56B. The diameter of the damping section 66A, 66B is less than the diameter of the damping chamber 56A, 56B allowing free movement of the poppet valve assembly 46 as the diaphragm 52 flexes in response to pressure changes.

Mounted on the damping section 66A, 66B of each poppet valve 48A, 48B is a damping chamber sealing member 72A, 72B providing a movable seal between the interior of the respective damping chambers 56A, 56B and the water passageways 50A, 50B. In one preferred embodiment, the damping chamber sealing member 72A, 72B is a piston ring having a high heat resistance, high heat deflection temperature (ASTM D468), and high flex modulus in elevated temperatures. One suitable piston ring material that has the above-listed qualities is Polyetherimide Resin ULTEM™ 1000. Other suitable sealing members may be made from non-rubber, low friction materials with the proper thermal and mechanical properties. An advantage of the damping chamber sealing member 72A, 72B is that an increased radial clearance is achieved between the wall of the damping chamber and the poppet valve. Another advantage of the damping chamber sealing member is that the precisely calculated gap 92A, 92B makes the manufacturing tolerance range wider with respect to the diameters of both the damping chamber 56A, 56B and the damping section 66A, 66B on the poppet valves 48A, 48B.

The sealing section 68A, 68B (see also FIGS. 8 and 9) of each poppet valve 48A, 48B consists of a sealing surface 74A, 74B. In a preferred embodiment, this sealing surface 74A, 74B has a conical shape. In order to provide the sealing action and control of the flow of water through the controlling orifices 58A, 58B, each orifice has a sealing member 76A, 76B mounted around it. Each sealing member is preferably made from a material having a hardness of at least 40 durometer on the Shore D scale. In one preferred embodiment, the sealing members 76A, 76B are made from a thermoplastic elastomer such as SANTOPRENE™. The sealing members 76A, 76B reduce the diameter of the controlling orifices 58A, 58B so that it is less than that of the sealing section 68A, 68B of the poppet valve 48A, 48B. The sealing member 76A, 76B provides a complementary sealing surface 78A, 78B to the sealing surface 74A, 74B of the poppet valve 48A, 48B. When in operation, the sealing surfaces 74A, 74B of the poppet valves 48A, 48B will move toward or away from the sealing surfaces 78A, 78B of the controlling orifices' sealing members 76A, 76B to control the flow of water through the water passageways 50A, 50B. Each poppet valve 48A, 48B has a support plate 70A, 70B to help stiffen the diaphragm 52 to provide a proper pressure responsive surface. The support plates 70A, 70B also incorporate male and female poppet valve interconnections 80A, 80B and 82A, 82B (described below).

Figure 3:
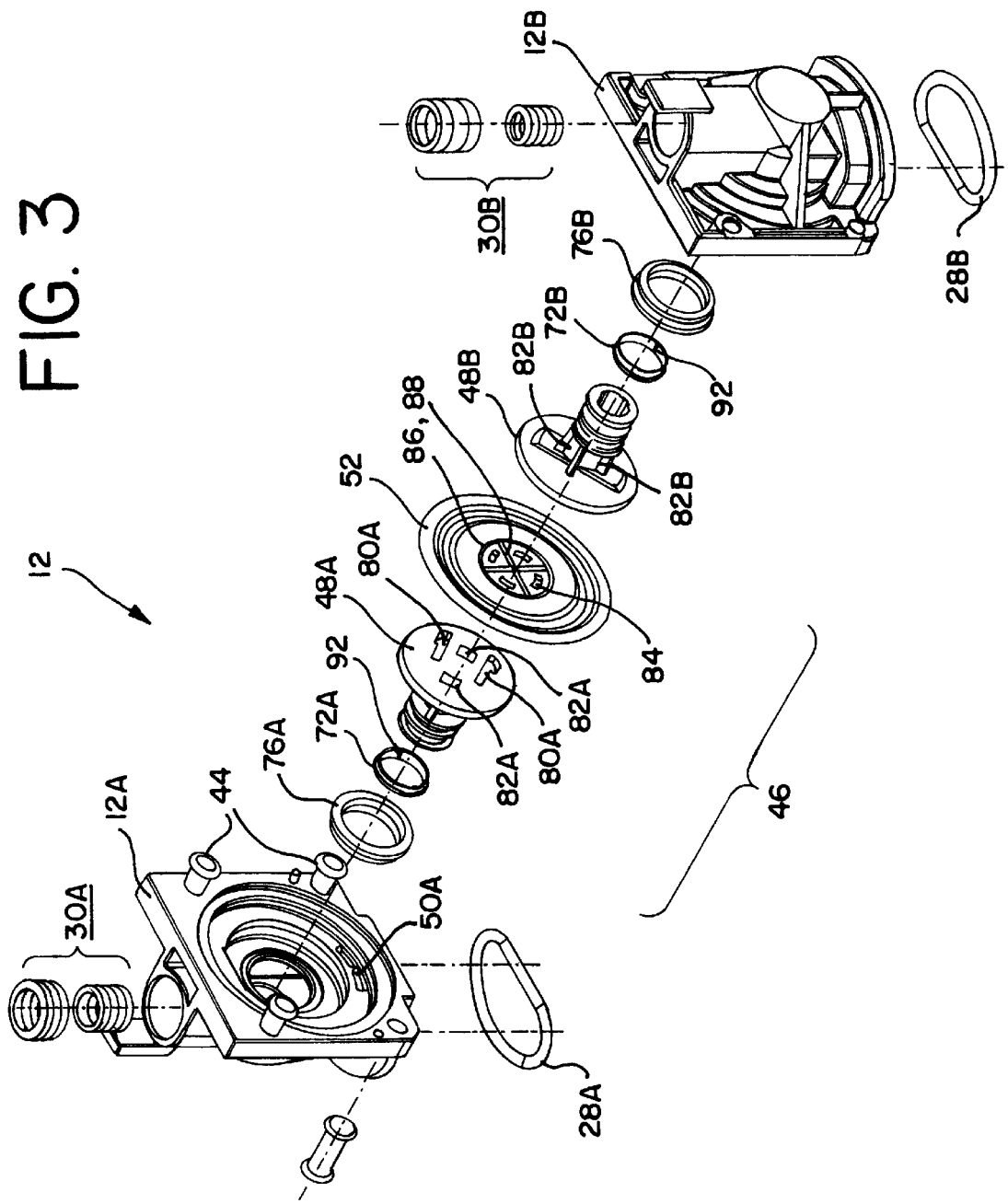
FIG. 3 is an exploded perspective view of a pressure balancing cartridge for use with the embodiment of FIG. 1.

Referring to FIGS. 2 and 3, the hot and cold poppet valves 48A, 48B are interconnected using the male 80A, 80B and female 82A, 82B snap fit connectors although other similar means of attachment may be used. The diaphragm 52 contains passages 84 to allow the snap fit connectors 80A, 80B and 82A, 82B to pass through. In assembly, the identical hot and cold poppet valves 48A, 48B are rotated 90 degrees with respect to each other to align the male connectors 80A, 80B with a respective female 82A, 82B connector on each poppet valve 48A, 48B. The poppet valves are then snapped together through the diaphragm 52. The diaphragm 52 contains circular 86 and cross shaped 88 beads to eliminate cross flow between the hot and cold water passageways 50A, 50B through the passages 84 in the diaphragm 52 for the poppet valve interconnection. The beads 86 and 88 are compressed by the pressure imparted on them by the interconnection of the poppet valves 48A, 48B.

Referring to FIGS. 2 and 3, a preferred embodiment of the pressure balancing cartridge includes multiple water bypass routes. A first bypass route is formed from a gap 92A, 92B left in the damping chamber sealing member 72A, 72B. A second bypass route is defined by the bypass holes 64A, 64B in each of the poppet valves 48A, 48B that forms a path from each damping chamber 56A, 56B through the internal cavity 62A, 62B of each poppet valve 48A, 48B and the bypass holes 64A, 64B on the outlet side of the controlling orifice 58A, 58B to the water outlets 60A, 60B. A third bypass route is formed between each damping chamber and the respective outlet through an auxiliary bypass slot 91A, 91B between each damping chamber and a respective outlet. In operation, a small amount of water is allowed to pass through the gap 92A, 92B in the damping chamber sealing member 72A, 72B and into the damping chamber 56A, 56B. The water then flows through the open end of the poppet valve 48A, 48B and into the internal cavity 62A, 62B. From the internal cavity 62A, 62B, the water then flows out of the bypass holes 64A, 64B and auxiliary bypass slots 91A, 91B to the water outlets 60A, 60B. When the valve is operating such that a controlling orifice 58A, 58B is sealed off preventing the flow of water, the gap 92A, 92B allows a small amount of water to bypass around the controlling orifice 58A, 58B.

The pressure balancing cartridge 12 can compensate for pressure changes only when the mixing plate assembly 14 lets the water flow on both sides. When mixing takes place, the poppet valve assembly 46 moves to a position where the pressure drops in the controlling orifices 58A, 58B create equal pressure on both sides of the diaphragm 52. When a sudden pressure drop occurs (such as when other faucets are turned on or a toilet is flushed), the poppet valve assembly 46 reacts and provides equal inlet pressure to the mixing plate assembly 14. The damping chambers 56A, 56B at the ends of the poppet valves 48A, 48B are provided to slow down the movement of the poppet valve assembly 46 and eliminate oscillation. When the pressure completely fails on one side, the pressurized side will operate to close itself off due to the forces on the diaphragm 52.

Figure 4:
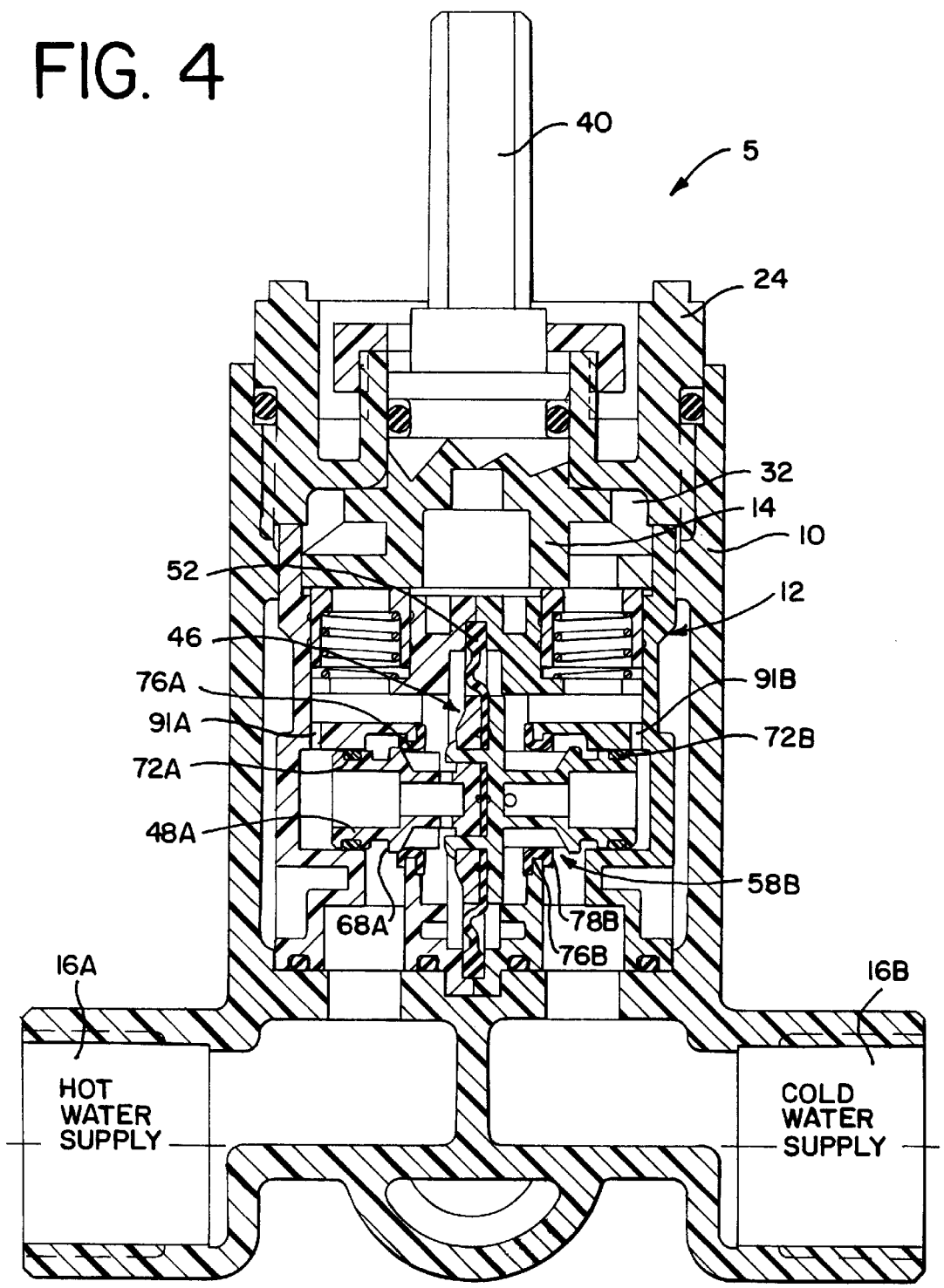
FIG. 4 is a cross sectional view depicting operation of a pressure balancing valve according to a preferred embodiment when the valve is set for 100% cold water flow.

FIGS. 4 through 7 depict operation of the pressure balancing valve 5. In FIG. 4, the valve 5 is being supplied with both hot and cold water pressure and the mixing plate assembly 14 is rotated to deliver 100% cold water to the mixing chamber 32. In this situation, the flow of cold water through the pressure balancing cartridge 12 creates a pressure drop on the cold water side. The higher pressure on the hot water side causes the poppet valve assembly 46 to move towards the cold side. This moves the sealing section 68A of the hot water poppet valve 48A toward the sealing member 76A of the hot water controlling orifice 58A and moves the sealing section 68B of the cold water poppet valve 48B away from the sealing member 76B of the cold water controlling orifice 58B. This allows for 100% cold water to flow through the valve 5 unimpeded. If the user of the valve 5 rotated the mixing plate assembly 14 for 100% hot water, the action of the valve 5 would be identical except that the poppet valve assembly 46 would move towards the hot water side, providing 100% hot water flow unimpeded.

Figure 5:
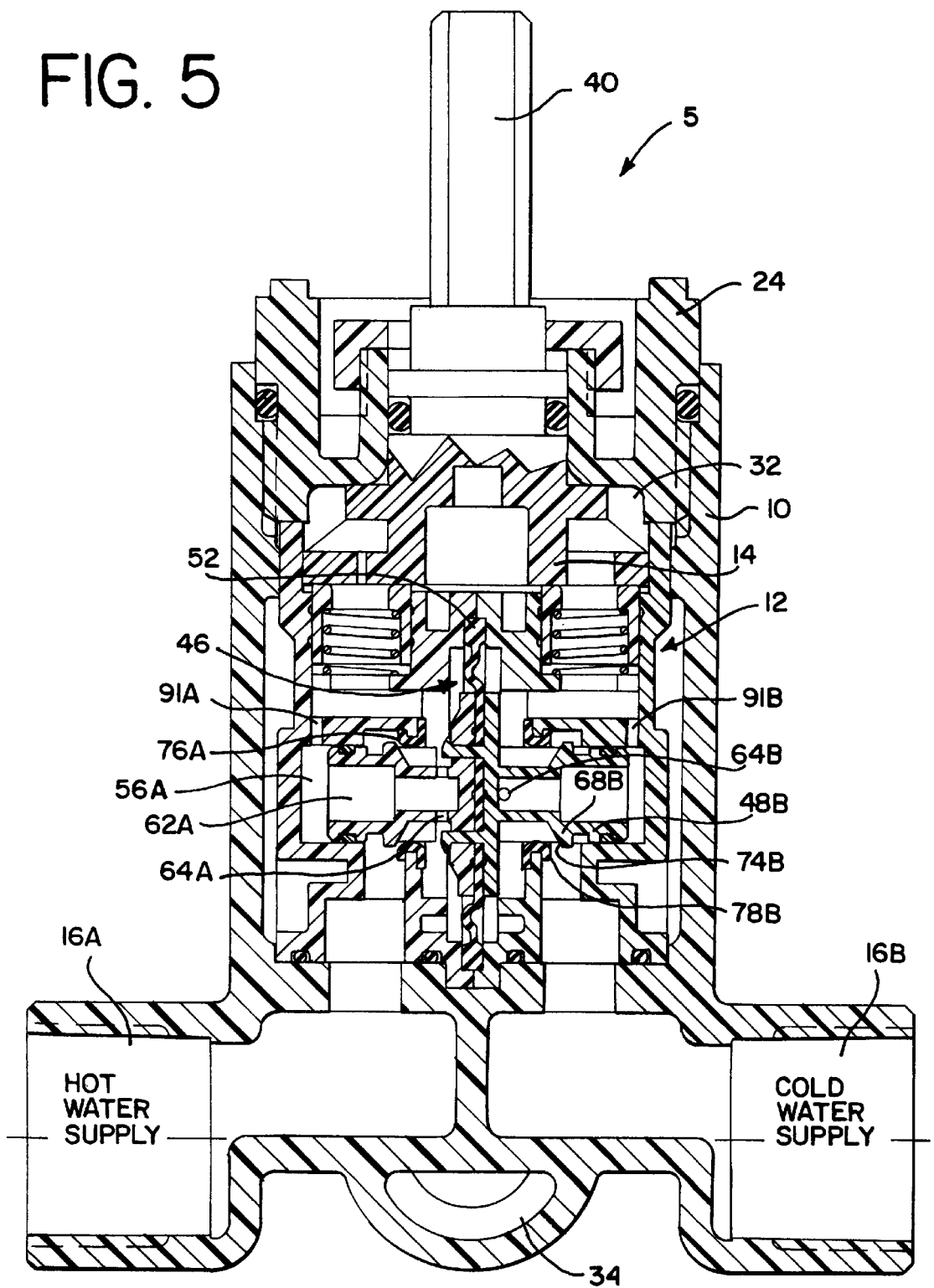
FIG. 5 is a cross-sectional view depicting operation of a pressure balancing valve according to a preferred embodiment when the valve is set for 80% cold water flow and 20% hot water flow.
Figure 6:
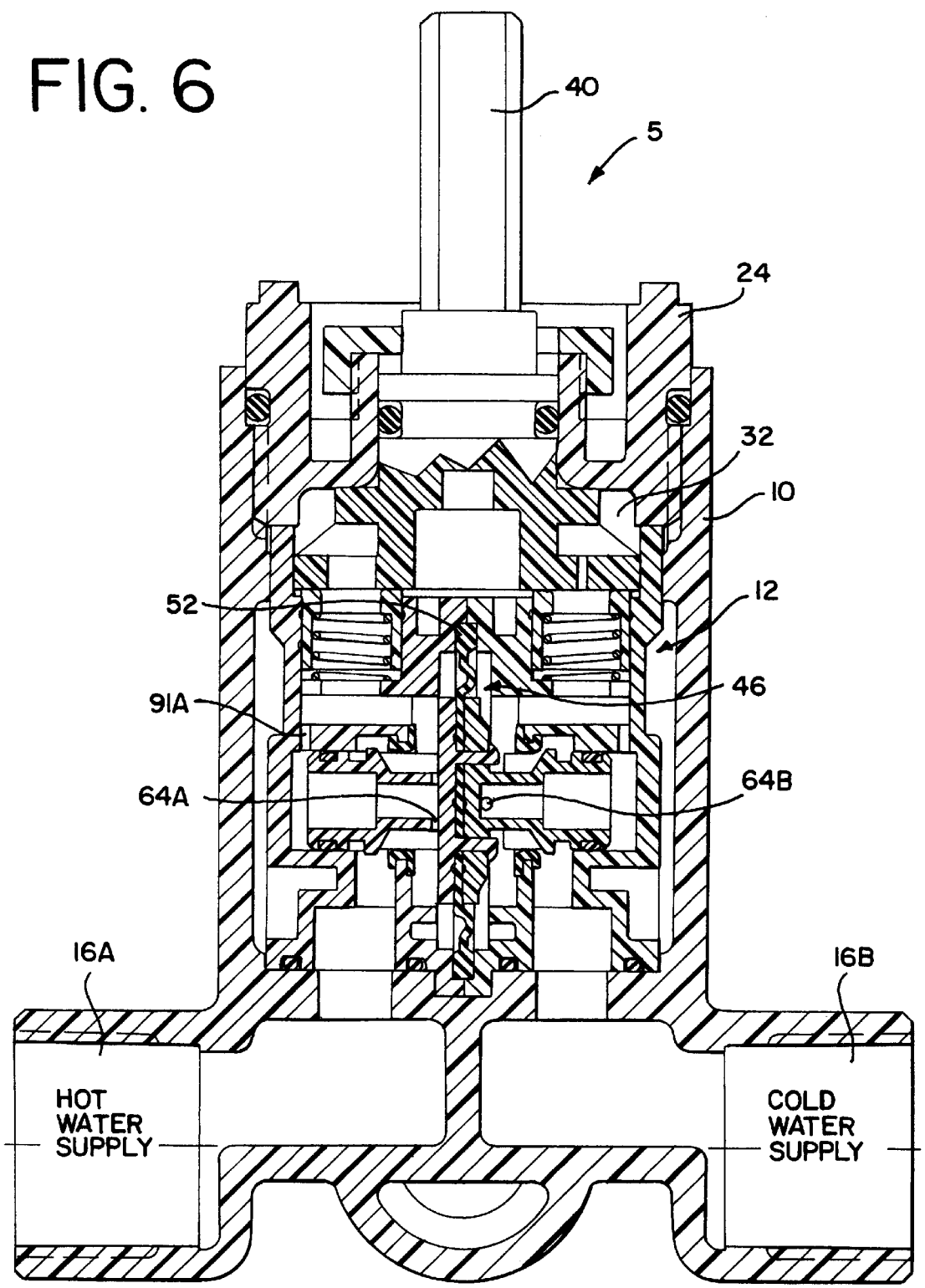
FIG. 6 is a cross-sectional view depicting operation of a pressure balancing valve according to a preferred embodiment when the valve is set for 20% cold water flow and 80% hot water flow.

FIG. 5 shows the operation of the pressure balancing valve 5 when the user has adjusted the mixing plate assembly 14 to provide for 80% cold water mixed with 20% hot water (see also FIG. 6 showing operation for 20% cold water and 80% hot water). In this case, the pressure on the higher flow side will be lower than the pressure on the lower flow side. The higher pressure will move the poppet valve assembly 46 towards the side that has the lower water pressure until the water pressure on both sides is equal. This will not completely seal off the higher pressure side.

Figure 7:
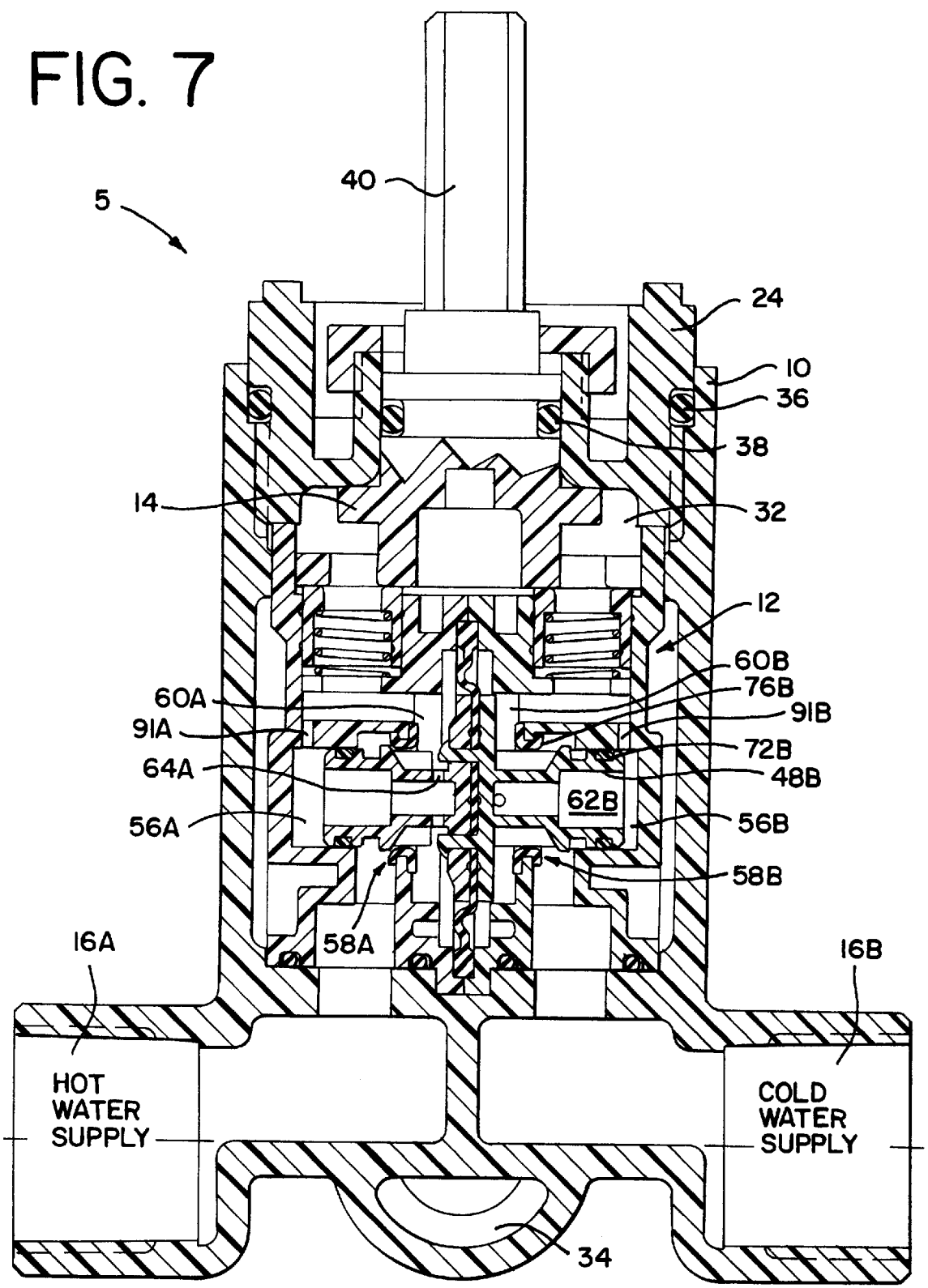
FIG. 7 is a cross-sectional view depicting operation of a pressure balancing valve according to a preferred embodiment when the valve is set for 50% cold water flow and 50% hot water flow when the cold water pressure fails.

FIG. 7 shows the operation of the pressure balancing valve 5 when the user has rotated the mixing plate assembly 14 for a 50%—50% mix of hot and cold water and the cold water pressure fails. With zero water pressure on the cold water side, the higher water pressure on the hot water side moves the poppet valve assembly 46 towards the cold water side forcing the hot water poppet 48A sealing section 68A to seal against the sealing member 76A of the controlling orifice 58A and shutting off the flow of hot water and preventing any danger of scalding. A small volume of hot water is allowed to pass through the bypass hole 64A and bypass gap 91A. Note that operation of the valve 5 when the hot water pressure fails would cause similar action but that the poppet valve assembly 46 would move towards the hot water side, cutting off the flow of cold water.

From the foregoing detailed description, a pressure balancing valve has been described. In a preferred embodiment, the pressure balancing valve uses lightweight, plastic poppet valves to achieve the features of a relatively large stroke, a fast response time, high sensitivity to pressure changes and good temperature control. In one embodiment, the poppet valves may be manufactured using an injection molding process. Additionally, a pressure balancing valve has been disclosed that permits the radial clearance between the poppet valve and the damping chamber wall to be increased substantially so that molded plastic parts may be used without the need for substantial secondary manufacturing operations. In one embodiment, the poppet valve assembly may have a radial clearance of approximately 0.005 inches on each side of a poppet valve between the poppet valve and the wall of the damping chamber. Additionally, a stroke of +/−0.035 inches (total of 0.07 inches) is achievable using a lightweight plastic material in a preferred embodiment.

It is intended that the foregoing detailed description be regarded as illustrative rather than limiting, and that it be understood that the following claims, including all equivalents, are intended to define the scope of this invention.

We claim:

1. A pressure balancing cartridge for use in a pressure balancing valve, the pressure balancing cartridge comprising a first and a second poppet valve, the first poppet valve having a structure identical to the second poppet valve, each of the first and second poppet valves comprising a plurality of discrete releasable connectors wherein the first poppet valve is releasably connected to the second poppet valve with the discrete releasable connectors.

2. The pressure balancing cartridge of claim 1, wherein each of the first and second poppet valves further comprise a first surface, wherein each of the releasable connectors comprise a male and a female snap fit connector, the male snap fit connector comprising a proximal end attached to the first surface and a distal end extending longitudinally from the first surface, and the female snap fit connector comprising a passage extending through the first surface and designed to releasably engage the distal end of the male snap fit connector on an opposite one of the first and second poppet valves.

3. The pressure balancing cartridge of claim 2, wherein the male snap fit connector has an L-shape and wherein the distal end comprises a retaining lip.

4. The pressure balancing cartridge of claim 1 wherein the pressure balancer further comprises a flexible diaphragm comprising a plurality of passages extending through the diaphragm and designed to allow the plurality of releasable connectors to extend therethrough wherein the diaphragm is releasably mounted between the first and second poppet valves.

5. A pressure balancing cartridge for use in a pressure balancing valve, the pressure balancing cartridge comprising:
   a housing defining a cavity;
   a first and a second damping chamber in fluid communication with the cavity, each of the first and second damping chambers having an interior wall;
   a poppet valve assembly movable within the cavity, the poppet valve assembly comprising first and second poppet valves, wherein the first and second poppet valves each comprise:
      a first portion defining a closure surface;
      a second portion movably disposed adjacent the interior wall of a respective one of the first and second damping chambers; and,
      a damping chamber sealing member mounted on the second portion and forming a slidably movable seal between the end portion and the interior wall, the damping chamber sealing member defining a passage extending through the sealing member allowing fluid communication between the cavity and the damping chamber;
   at least one inlet for receiving a supply of water into the pressure balancing cartridge;
   at least one outlet for transmitting the supply of water from the pressure balancing cartridge; and,
   first and second controlling orifices providing fluid communication between the at least one inlet and the at least one outlet, wherein the controlling orifices further comprise sealing members formed of a compliant material and mounted on the controlling orifice sealable against the closure surfaces of the first portion of the first and second poppet valves.

6. The pressure balancing cartridge of claim 5 wherein the damping chamber sealing member on the end portion of each of the first and second poppet valves is a piston ring.

7. The pressure balancing cartridge of claim 5 wherein each of the first and second poppet valves further comprises a hollow interior portion extending through the first portion and a first damping hole providing fluid communication between the interior and the damping chamber and a second damping hole providing fluid communication between the interior and the cavity.

8. A pressure balancing cartridge for a pressure balancing valve, the pressure balancing cartridge comprising:
   a housing defining first and second damping chambers in fluid communication with a cavity and comprising first and second inlets for receiving a supply of water into the cavity, first and second outlets for transmitting a flow of water out of the cavity, and first and second controlling orifices each connecting a respective one of the inlets to a respective one of the outlets, whereby the cavity defines first and second separate flow paths;
   a poppet valve assembly movably mounted within the cavity; the poppet valve assembly having first and second poppet valves, each of the poppet valves comprising:
      an interior;
      a first portion comprising a first damping hole providing fluid communication between the interior and a respective damping chamber and a second damping hole providing fluid communication between the interior and the cavity;
      a damping chamber end having a diameter less than a diameter of a respective damping chamber and movably positioned in the damping chamber;
      a damping chamber sealing member disposed on the damping chamber end;
      a controlling orifice closure portion positioned adjacent the damping chamber end and having a diameter greater than a diameter of a respective controlling orifice; and
      a hub connected to the controlling orifice closure portion, the hub comprising at least one releasably interlocking connector configured to connect with a releasably interlocking connector on another poppet valve;
   the poppet valve assembly further comprising sealing members formed from a compliant material and mounted on the controlling orifices; and
   a flexible diaphragm, responsive to fluid pressure and releasably mounted between the hubs of the first and second poppet valves, the diaphragm mounted within the cavity of the cartridge so as to separate the first and second fluid flow paths, the diaphragm comprising at least one opening through the diaphragm to allow passage of the releasably interlocking connectors.

9. The pressure balancing cartridge of claim 8 wherein the damping chamber sealing member comprises a passage providing for fluid communication between the cavity and the damping chamber.

10. The poppet valve assembly of claim 8 wherein the diaphragm further comprises sealing beads formed on the surfaces of the diaphragm surrounding the at least one opening in the diaphragm.

11. The pressure balancing cartridge of claim 10 wherein the sealing beads comprise a first circular bead centrally located on the diaphragm and encircling the at least one opening, and a second cross-shaped bead located within the first bead and dividing each of the openings into separate areas.

12. The pressure balancing cartridge of claim 8 wherein the releasably interlocking connectors comprise at least one male snap fit connector extending longitudinally from the hub, the hub further comprising at least one female connector passage configured to receive the male snap fit connectors.

13. The poppet valve assembly of claim 12 wherein the at least one male snap fit connector comprises a proximal end connected to the hub and a distal end formed with a retaining lip.

14. A pressure balancing cartridge for use in a pressure balancing valve, the pressure balancing cartridge comprising:
   a housing defining a cavity;
   a poppet valve assembly movable within the cavity; the poppet valve assembly comprising first and second poppet valves, wherein the first and second poppet valves each comprise a first portion defining a closure surface;
   at least one inlet for receiving a supply of water into the pressure balancing cartridge;
   at least one outlet for transmitting the supply of water from the pressure balancing cartridge;
   first and second controlling orifices providing fluid communication between the at least one inlet and the at least one outlet, wherein the controlling orifices are sealable against the closure surfaces of the first portion of the first and second poppet valves;
   a first and a second damping chamber in fluid communication with the cavity, each of the first and second damping chambers having an interior wall with a first diameter, wherein the first and second poppet valves each further comprise an end portion movable within a respective one of the damping chambers, the end portion having a second diameter where the second diameter is less than the first diameter; and a damping chamber sealing member mounted on the end portion and forming a slidably movable seal between the end portion and the interior wall, wherein the damping chamber sealing member comprises an aperture defining a water bypass.

15. The pressure balancing cartridge of claim 14, wherein the damping chamber sealing member comprises a piston ring.

16. A pressure balancing cartridge for a pressure balancing valve, the pressure balancing cartridge comprising:

a housing defining first and second damping chambers in fluid communication with a cavity, the housing further comprising first and second inlets for receiving a supply of fluid into the cavity, first and second outlets for transmitting a flow of fluid out of the cavity, and first and second controlling orifices each connecting a respective one of the inlets to a respective one of the outlets, whereby the cavity defines first and second separate flow paths;

a poppet valve assembly movably mounted within the cavity; the poppet valve assembly having first and second poppet valves each of the poppet valves comprising:

a damping chamber end having a diameter less than a diameter of an interior wall of a respective damping chamber and movably positioned in the damping chamber;

a damping chamber sealing member disposed on the damping chamber end; and, a controlling orifice closure portion positioned adjacent the damping chamber end;

a flexible diaphragm, responsive to fluid pressure and releasably mounted between the first and second poppet valves, the diaphragm mounted within the cavity of the cartridge so as to separate the first and second fluid flow paths, the diaphragm comprising at least one opening through the diaphragm configured to receive the releasably interlocking connectors;

first and second damping chamber fluid bypass channels defined by the housing and connecting an opening in the interior wall of each of the first and second damping chambers with a respective one of the first and second outlets; and, first and second poppet valve fluid bypass channels defined by a hollow passage extending through each of the poppet valves, each poppet valve bypass channel providing fluid communication between one of the first and second damping chambers and a respective one of the first and second outlets.

17. The pressure balancing cartridge of claim 16, further comprising a third fluid bypass channel defined by a passage in each of the damping chamber sealing members providing fluid communication between each damping chamber and a respective one of the two outlets.

\* \* \* \* \*